United States Patent [19]
Sagawa et al.

[11] Patent Number: 6,047,098
[45] Date of Patent: Apr. 4, 2000

[54] PLASTIC OPTICAL WAVEGUIDE AND OPTICAL SWITCH USING SAME

[75] Inventors: Masakazu Sagawa, Oume; Takao Miwa, Hitachinaka; Hisao Yokokura, Hitachi, all of Japan

[73] Assignee: Hitachi, Ltd., Tokyo, Japan

[21] Appl. No.: 09/018,313

[22] Filed: Feb. 3, 1998

[30] Foreign Application Priority Data

Feb. 7, 1997 [JP] Japan .................................... 9-024722

[51] Int. Cl.[7] ............................. G02B 6/00; C08G 63/00
[52] U.S. Cl. ........................... 385/141; 385/15; 385/16; 385/123; 385/143; 385/145; 528/271
[58] Field of Search .............................. 385/15, 16, 123, 385/141, 142, 143, 144, 145; 528/271, 350, 353

[56] References Cited

U.S. PATENT DOCUMENTS

| | | | |
|---|---|---|---|
| 4,302,233 | 11/1981 | Ahme et al. | 501/3.43 |
| 4,385,165 | 5/1983 | Ahne et al. | 528/53 |
| 4,397,999 | 8/1983 | Ahne et al. | 525/426 |
| 5,108,201 | 4/1992 | Matsuura et al. | 385/143 |
| 5,270,431 | 12/1993 | Blum | 528/69 |
| 5,572,619 | 11/1996 | Maruo et al. | 385/143 |
| 5,598,501 | 1/1997 | Maruo et al. | 385/143 |

Primary Examiner—Brian Healy
Attorney, Agent, or Firm—Antonelli, Terry, Stout & Kraus, LLP

[57] ABSTRACT

A plastic optical waveguide with a low loss property, a low birefringence and a high temperature endurance constructed with a polyimide obtained from an acid dianhydride based component and a diamine based component, wherein at least one of a core layer and a cladding layer of the optical waveguide is made of an acid dianhydride based component including an alicyclic acid dianhydride or an aliphatic acid dianhydride, the plastic optical waveguide having an optical loss in a 1.3 $\mu$m band of 0.5 dB/cm or less, and a refractive index of the core layer being larger than that of the cladding layer.

10 Claims, 1 Drawing Sheet

FIGURE
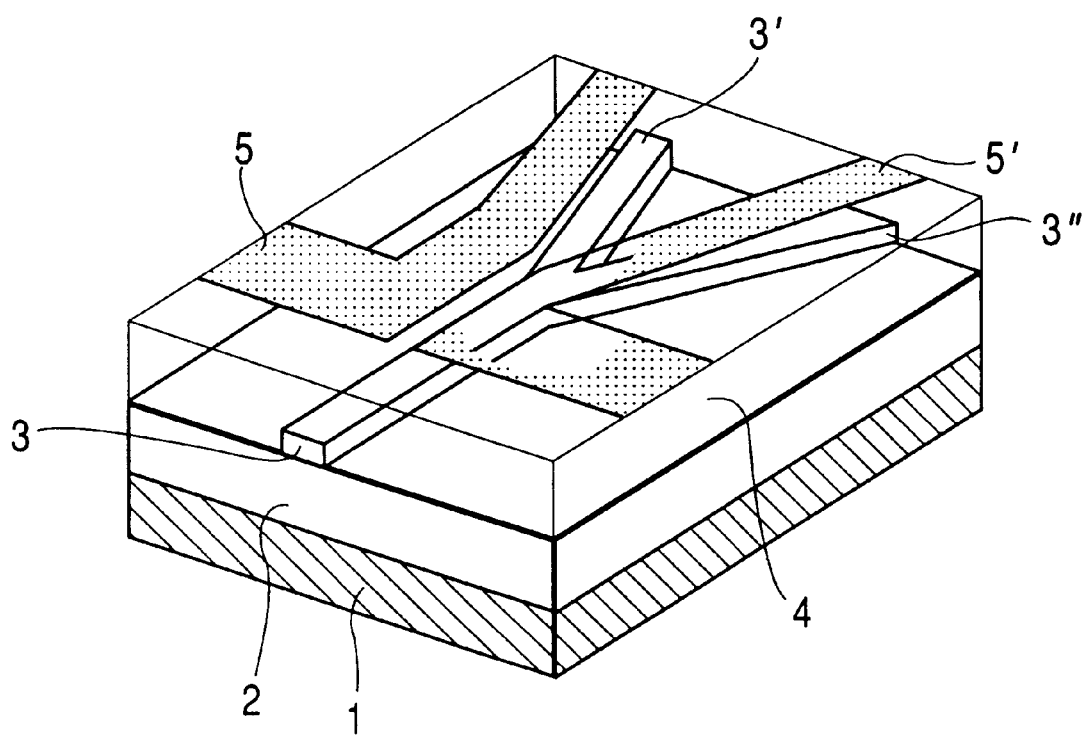

PLASTIC OPTICAL WAVEGUIDE AND OPTICAL SWITCH USING SAME

BACKGROUND OF THE INVENTION

1. Field of the Invention

The present invention relates to a plastic optical waveguide used in applications, such as optical communication and the like, and an optical switch using the same.

2. Description of the Related Art

There have been rapid advances in technical development directed to popularization of general public as subscribers, such as private homes, of optical communication networks for realization of an a concept referred to as FTTH (Fiber To The Home). In regard to an optical node unit intended for use by a subscriber, high performance, high reliability and a lower cost have become the most important objectives in such development.

In parallel to such a movement, a study concerning the application of optical communication technology to a computer has simultaneously progressed, and in such an application, higher integration and hybridization of electronic elements have been called for.

As a technology to meet such needs, developments concerning an optical waveguide and an optical fiber made of an high polymer material have energetically been conducted. The physical properties required for such a material are (1) low propagation loss, (2) low birefringence and (3) high temperature endurance.

In such circumstances, the earliest material developed was a polymethacrylic acid resin, but though it has excellent optical properties, either the high temperature endurance or resistance to humidity properties were found to be not sufficient. Then polystyrene, polycarbonate and the like were studied, but the glass transition temperatures of these materials are on the order of 150° C., and thereby they exhibit a low temperature endurance, and the inherent birefringence is about 20 times as high as that of acrylic resin.

Very recently, fluorine containing polyimide, which has an improved high temperature endurance, has been proposed (see Publication of Unexamined Japanese Patent Application No. Hei 3-72528), which material is an optical plastic satisfying a low loss requirement in an infrared region.

However, the polyimide has a large birefringence caused by its properties of orientation and anisotropy in polarization. Therefore, when a waveguide is constructed with the material, there arises an intrinsic birefringence in the range of 0.1 to 0.3, which has been a serious problem.

In the case where an optical waveguide or an optical fiber having such a birefringence is incorporated in an optical network, a great limitation arises in the total length of an element because of so-called mode dispersion. That is, taking a network having a capacity of 10 Gbit/s as an example, an allowable length of an element is 300 mm, and, as a result, it is impossible to construct an optical network system having a sufficient scale.

TABLE 1

| birefringence | allowable length of element |
| --- | --- |
| 0.1 | 30 mm |
| 0.01 | 300 mm |
| 0.001 | 3,000 mm |

In the Publication of Unexamined Japanese Patent Application No. Hei 7-56030, there is disclosed an optical waveguide using polyimide, including an alicyclic diamine as an diamine component, as a plastic material which has improved on that problem.

There is, however, still a problem that a loss in the 1.3 gm band is as large as, for example, 0.8 dB/cm.

Polyimide is obtained by applying a heat treatment and the like to a coat of a polyamic acid solution, which is generally obtained in a reaction between an acid dianhydride and a diamine to cause a dehydration ring-closing reaction.

In the case where an aromatic acid dianhydride as the acid dianhydride component and an aliphatic amine as the diamine component are used, it is known that, since an acidity of polyamic acid produced and a basicity of a diamine produced are both high, a carboxyl group of polyamic acid and amine forms a strong salt. For this reason, it is considered that an amine group is left behind in the polyimide, so that a N—H stretching vibration in the 1.3 $\mu$m band arises, which in turn causes a large optical loss.

SUMMARY OF THE INVENTION

It is an object of the present invention to provide a plastic optical waveguide with a low loss, a low birefringence and a high temperature endurance, and an optical switch using the same.

The present inventors have been a conducted a research on a composition of polyimide in order to solve the above problem giving serious attention to the polyimide. That is, optical waveguides were made of various kinds of polyimide respectively having different compositional ratios of a diamine component and an acid anhydride component, and the optical loss and birefringence in a 1.3 $\mu$m band and the thermal stability were evaluated. The present invention has been achieved based on the results of this research. The basic features of the present invention are as follows:

(1) A plastic optical waveguide which is constructed with a polyimide obtained from an acid dianhydride based component and a diamine based component, in which at least one of a core layer and a cladding layer of the optical waveguide is made of an acid dianhydride based component including an alicyclic acid dianhydride or an aliphatic acid dianhydride, which has an optical loss in a 1.3 $\mu$m band of 0.5 dB/cm or less, and in which a refractive index of the core layer is larger than that of the cladding layer.

(2) A plastic optical waveguide in which the acid dianhydride based component is an acid dianhydride having a linear saturated hydrocarbon skelton.

(3) A plastic optical waveguide in which the acid dianhydride based component is an acid dianhydride having an alicyclic saturated hydrocarbon skeleton.

(4) A plastic optical waveguide as recited in Item (3) in which the acid dianhydride based component is an acid dianhydride having a bridged alicyclic hydrocarbon structure.

(5) A plastic optical waveguide in which at least one of a core layer and a cladding layer constructing the optical waveguide is one or more material selected from the group consisting of 1,2,3,4-butane tetracarboxylic acid dianhydride, 1,2,3,4-cyclobutane tetracarboxylic acid dianhydride, 1,2,3,4-cyclohexane tetracarboxylic acid dianhydride, 1,2,4,5-cyclohexane tetracarboxylic acid dianhydride, 3,3',4,4'-dicyclohexane tetracarboxylic acid dianhydride, 2,2',3,3'-dicyclohexane tetracarboxylic acid dianhydride, and which has an optical loss in a 1.3 $\mu$m band of 0.5 dB/cm or less, and in which a refractive index of the core layer is larger than that of the cladding layer.

(6) An optical switch comprising a core layer whose refractive index changes by an optical effect and a cladding layer in which the core is present, said optical switch having two or more branch waveguides, wherein the core and cladding layer are constructed with the plastic optical waveguides recited in Items (1) to (5).

Since a polymer having a saturated hydrocarbon type dianhydride as a constituent has a bulkier structure, compared with a polymer having a conventional aromatic dianhydride as a constituent, it is considered that the anisotropy in polarization of a polymer main chain itself is alleviated, and, at the same time, main chains are hard to be mutually subjected to stacking, and thus anisotropy in polarization as a whole is further reduced.

BRIEF DESCRIPTION OF THE DRAWING

The FIGURE is a typical perspective view of an optical switch of a thermo-optical type using a plastic optical waveguide.

DETAILED DESCRIPTION OF THE PREFERRED EMBODIMENTS

The acid dianhydride is desirably compatible with both high temperature endurance and also optical properties. When an acid dianhydride having a linear saturated hydrocarbon skelton is used, an optical waveguide having an excellent flexibility can be produced, and when an acid dianhydride having an alicyclic saturated hydrocarbon skelton is used, an optical waveguide having a high temperature endurance can be produced. Especially, the case where a high temperature is necessary, or in the case where a loss is especially problematic, an acid dianhydride having a cyclobutane ring structure is preferably used.

When a plastic optical waveguide is used in an environment where water is present, an acid dianhydride having a cyclohexane ring or dicyclohexane ring is used to obtain more excellent properties. A cyclohexane ring gives a high temperature endurance and a low loss property and a dicyclohexane ring will reduce birefringence to a minimum. When an aliphatic acid dianhydride having a bridged alicyclic hydrocarbon structure is used, an optical waveguide having a lower refractive index can be obtained, compared with other cases.

As an aliphatic acid dianhydride having a bridged alicyclic hydrocarbon structure, there is bicyclo (2,2,1) heptane-2-exo-3-exo-5-exo-6-exo-tetracarboxyl acid dianhydride.

(1)

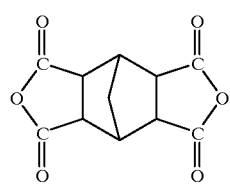

Alicyclic acid dianhydrides can be properly used in different ways for respective uses. The acid dianhydrides can be used singly or in a mixture in combination and other acid dianhydrides can be added thereto. In this case, an additional amount is preferably not to exceed a compositional ratio of an alicyclic anhydride in the sense of reducing birefringence.

However, in the case where an acid anhydride component and a diamine component both are polyimides each including a benzene ring, the birefringence is as large as 0.005 or more and the object of the present invention has not been able to be achieved, but in the case where an aliphatic diamine is used as a diamine component, the magnitude of birefringence is relatively smaller.

A polyimide using an acid anhydride, including a benzene ring, has an optical loss in the 1.3 $\mu$m band is of 0.8 d/cm or more, which is problematic.

If a polyimide composed of an aliphatic diamine and an aliphatic acid dianhydride is used, the birefringence is conspicuously smaller and the optical loss in the 1.3 $\mu$m band is smaller, compared with the case where an aliphatic diamine and an aromatic acid dianhydride are used, so that the object of the present invention has been achieved in the points just mentioned, too.

In the case where an optical waveguide was produced using a polyimide obtained with combination of an aliphatic acid dianhydride and an aromatic diamine, too, the birefringence and optical loss were both reduced, and the object of the present invention was achieved.

In the case where an acid dianhydride having a saturated hydrocarbon skelton was used, it is considered that since the acidity of the polyamic acid produced is low and thereby formation of a salt with amine is suppressed, an optical loss in the 1.3 $\mu$m band is suppressed so as not to be larger.

As a diamine based component used in the present invention, there is no limitation on an aromatic diamine and aliphatic diamine, as described above. When an aromatic diamine is used, an optical waveguide with an extremely high temperature endurance can be obtained. When an aliphatic diamine is used, an optical waveguide with an extremely small birefringence can be obtained. When an alicyclic diamine among aliphatic diamines is used, an optical waveguide with a high temperature endurance, which is almost equal to that when an aromatic diamine is used, in addition other optical properties, can be obtained. Theses diamine components are respectively used for different uses in a proper manner.

A fluoride as a diamine component can further reduce the optical loss in the 1.3 $\mu$m band.

As fluorinated diamine components, there are: 2,2'-bis(trifluoromethyl)-4,4',-diaminobiphenyl, 3,3'-bis(trifluoromethyl)-4,4',-diaminobiphenyl, 2,2'-bis(4-aminophenyl)hexafluoro-propane, 2,2'-bis(4(4-aminophnoxy)phenyl)hexafluoro-propane, and 2,2'-bis(4(2-aminophnoxy)phenyl)hexafluoropropane.

As a method for an optical waveguide using materials according to the present invention, the following method is generally applicable.

A quartz substrate or a silicon substrate, both with a good flatness, is prepared as a substrate. A varnish of polyamic acid of the present invention is applied on a surface of the substrate by spin coating to form a lower cladding layer, and thereafter the coat is heated to obtain an imide of a film thickness of about 10 $\mu$m.

A polyimide whose refractive index is slightly different (by about 0.3%) than that of the cladding layer is applied on the cladding layer to a thickness of 8 $\mu$m to form a core layer, and then the layers are subjected to a photolithographic technique and an anisotropic reactive ion etching (RIE) method by a gas including $O_2$ as a main component, so that a channel waveguide with a width of 8 $\mu$m is fabricated. The thus fabricated channel waveguide is buried in polyimide, which is the same as that of the lower cladding layer, and then an upper cladding layer with a film thickness of 10 $\mu$m is formed on the core layer. Thereby, a three layer buried type optical waveguide is completed.

EXAMPLES

Example 1

1,2,3,4-cyclobutanetetracarboxylic acid dianhydride (BTC) and 4.4'-diaminodiphenylsulfone (4.4'-DDS) were reacted in NMP to obtain polyamic acid.

The polyamic acid was applied on a quartz substrate by spin-coating, the coating was baked at 80° C. for 5 min to vaporize a solvent NMP off the coating and the coating was further baked at 200° C. for 60 min to be transformed into imide, so that a three layered planar type optical waveguide composed of air/polyimide/quartz was obtained.

The fabricated optical waveguide was transparent and the birefringence was evaluated with use of a refractometer of a prism coupling type (made by Metricon Co., Model 2000). In regard to the optical loss, this was evaluated by a propagation loss analyzer of a prism sliding type (made by Electron & Photon laboratory Incorporation, RIT-200 model) The results show that the birefringence and a propagation loss were very small, as shown in Table 2.

TABLE 2

| | acid anhydride | diamine | n(TE) | n(TM) | n(TE)-n(TM) | propagation loss (dB/cm) |
|---|---|---|---|---|---|---|
| Ex. 1 | BTC | 4,4'-DDS | 1.5823 | 1.5843 | −0.002 | 0.4 |
| Ex. 2 | BTC | p'-APPS | 1.5865 | 1.5857 | 0.0008 | 0.4 |
| Ex. 3 | BTC | m-APPS | 1.5878 | 1.5875 | 0.0003 | 0.4 |
| Ex. 4 | BTC | 6F-BAPP | 1.5544 | 1.5511 | 0.0033 | 0.3 |
| Ex. 5 | BTC | BAPD | 1.5967 | 1.5954 | 0.0013 | 0.4 |
| Ex. 6 | BTC | DDE | 1.5982 | 1.5975 | 0.0007 | 0.5 |
| Ex. 7 | CHDA | DDE | 1.5991 | 0.5986 | 0.0005 | 0.5 |
| Ex. 8 | BHDA | CHD | 1.5991 | 1.5991 | 0 | 0.4 |
| Comp. Ex. 1 | PMDA | DDE | 1.6708 | 1.6404 | 0.0304 | 1.2 |
| Comp. Ex. 2 | S-BPDA | CHD | 1.5266 | 1.5265 | 0.0001 | 1.0 |

TE: Transverse Electric
TM: Transverse Magnetic
BTC: : 1, 2, 3, 4-cyclobutanetetracarboxylic acid dianhydride
CHDA: 1, 2, 4, 5-cyclohexanetetracarboxylic acid dianhydride
CHDA: 3, 3', 4, 4'-bicyclohexanetetracarboxylic acid dianhydride
4, 4'-DSS: 4. 4'-diaminodiphenylsulfone
p-APPS: bis [4(4-aminophenoxy)phenyl] sulfone
m-APPS: bis [4(3-aminophenoxy)phenyl] sulfone
6F-BAPP: 2, 2-bis[4(4-aminophenoxy)phenyl] hexafluoropropane
BAPD: 2, 2-bis[4(4-aminophenoxy)phenyl] propane
DDE: 4. 4'-diaminodiphenylether
CHD: 1, 4-diaminocyclohexane

Examples 2 to 8

An acid dianhydride component and a diamine component are changed to those described in the table 2 and the others were conducted in the same way as that in the example 1 to form a three layered slab type optical waveguide. A birefringence and a propagation loss of the optical wave guide were evaluated, the results of which are shown in the table 2. In each example, the values were very small.

Comparative Examples 1 to 2

Pyromellitic acid anhydride (PMDA), which is an aromatic acid anhydride, and 3,3',4,4'-biphenyltetracarboxylic acid dianhydride were used and diamine components described in the table 2 were used to form a slab type optical waveguide in the same way as that in the example 1, except for the above mentioned components. The birefringence and optical loss were evaluated, and as a result, the birefringence in the comparative example 1 was larger, and in the comparative example 2, the optical loss was larger.

Moreover, a glass transition temperature was measured concerning the materials shown in the table 2 by means of a dynamic mechanical analyzer, and either of the comparative examples showed a transition temperature of 200° C. or higher.

Besides, a glass transition temperature (Tg) was measured for the materials shown in the table 2 by means of a dynamic mechanical analyzer, and either of the comparative examples showed 200° C. or higher.

Example 9

In the FIGURE, an optical switch of a thermo-optical type using a plastic optical waveguide is shown. Polyimide was used as the material of a lower cladding layer 2 and an upper cladding layer 4 and the polyimide of the example 2 was used to form a core 3 (Y-branch waveguide). The thin film heaters 5, 5' made of Cr were fabricated on the surface of the upper cladding layer.

When one of the thin film heaters 5 was supplied with electricity, the optical waveguides 3 or 3' located thereunder were heated, causing the temperature to be raised, and the refractive index was decreased by a thermo-optical effect. Thereby, a phenomenon, as if the optical waveguide in this part disappeared, arose and light propagated through the waveguide 3 or 3' whose refractive index was higher, in which the other heater 5' was not supplied with electricity. In the example, a power of about 70 mW was supplied, which is sufficient to switch routes of light propagation therebetween.

According to the present invention, a plastic optical waveguide with a low loss property, a low birefringence and a high temperature endurance can be provided.

What is claimed is:

1. A plastic optical waveguide constructed with a polyimide obtained from an acid dianhydride based component and a diamine based component, wherein, in said plastic optical waveguide:

at least one of a core layer and a cladding layer of the optical waveguide is made of an acid dianhydride based component which includes an alicyclic acid dianhydride or an aliphatic acid dianhydride, said plastic optical waveguide has an optical loss in a 1.3 μm band of 0.5 dB/cm or less, and a refractive index of the core layer is larger than that of the cladding layer.

2. A plastic optical waveguide according to claim 1, wherein the acid dianhydride based component is an acid dianhydride having a linear saturated hydrocarbon skeleton.

3. A plastic optical waveguide according to claim 1, wherein the acid dianhydride based component is an acid dianhydride having an alicyclic saturated hydrocarbon skeleton.

4. A plastic optical waveguide according to claim 1, wherein the acid dianhydride based component is an acid dianhydride having a bridged alicyclic hydrocarbon structure.

5. A plastic optical waveguide constructed with a polyimide obtained from an acid dianhydride based component and a diamine based component, wherein, in said plastic optical wave guide:

at least one of a core layer and a cladding layer constructing the optical waveguide are made of one or more materials from the group consisting of 1,2,3,4-butane tetracarboxylic acid dianhydride, 1,2,3,4-cyclobutane tetracarboxylic acid dianhydride, 1,2,3,4-cyclohexane tetracarboxylic acid dianhydride, 1,2,4,5-cyclohexane tetracarboxylic acid dianhydride, 3,3',4,4'-dicyclohexane tetracarboxylic acid dianhydride, 2,2',3,3'-dicyclohexane tetracarboxylic acid dianhydride, said optical waveguide having an optical loss in a 1.3 μm band of 0.5 dB/cm or less, and a refractive index of the core layer being larger than that of the cladding layer.

6. An optical switch, comprising a core layer whose refractive index changes by an optical effect and a cladding layer in which the core is present, having two or more branch waveguides, wherein, in said optical switch:

the core and cladding layer are constructed with polyimide obtained from an acid dianhydride based component, and a diamine based component and the acid dianhydride based component includes an alicyclic acid dianhydride and an aliphatic acid dianhydride, the optical waveguide having an optical loss in a 1.3 μm band of 0.5 dB/cm or less, and a refractive index of the core layer being larger than that of the cladding layer.

7. An optical switch according to claim 6, wherein the acid dianhydride based component is an acid dianhydride having a linear saturated hydrocarbon skeleton.

8. An optical switch according to claim 6, wherein the acid dianhydride based component is an acid dianhydride having an alicyclic saturated hydrocarbon skeleton.

9. An optical switch according to claim 6, wherein the acid dianhydride based component is an acid dianhydride having a bridged alicyclic hydrocarbon structure.

10. An optical, comprising a core whose refractive index changes by an optical effect and a cladding layer in which the core is present, having two or more branch waveguides, wherein, in said optical switch:

a plastic optical waveguide constructed with a polyimide obtained from an acid dianhydride based component and a diamine based component are used; in which at least one core and a cladding layer constructing the optical waveguide are made of one or more materials selected from the group consisting of 1,2,3,4-butane tetracarboxylic acid dianhydride, 1,2,3,4-cyclobutane tetracarboxylic acid dianhydride, 1,2,3,4-cyclohexane tetracarboxylic acid dianhydride, 1,2,4,5-cyclohexane tetracarboxylic acid dianhydride, 3,3',4,4'-dicyclohexane tetracarboxylic acid dianhydride, 2,2',3,3'-dicyclohexane tetracarboxylic acid dianhydride, said optical waveguide having an optical loss in a 1.3 μm band of 0.5 dB/cm or less, and a refractive index of the core being larger than that of the cladding layer.

* * * * *